(12) United States Patent
Schorsch

(10) Patent No.: US 10,113,618 B2
(45) Date of Patent: Oct. 30, 2018

(54) COMPOUND PLANETARY FRICTION DRIVE

(71) Applicant: Technische Unversiteit Delft, Delft (NL)

(72) Inventor: Jack Floyd Schorsch, Delft (NL)

(73) Assignee: Technische Universiteit Delft, Delft (NL)

( * ) Notice: Subject to any disclaimer, the term of this patent is extended or adjusted under 35 U.S.C. 154(b) by 0 days.

(21) Appl. No.: 15/461,170

(22) Filed: Mar. 16, 2017

(65) Prior Publication Data

US 2017/0184185 A1   Jun. 29, 2017

Related U.S. Application Data

(63) Continuation of application No. PCT/NL2015/050607, filed on Sep. 2, 2015.

(30) Foreign Application Priority Data

Sep. 19, 2014  (NL) ..................................... 2013496

(51) Int. Cl.
  *F16H 13/06*  (2006.01)
  *F16H 13/10*  (2006.01)

(52) U.S. Cl.
  CPC ............ *F16H 13/06* (2013.01); *F16H 13/10* (2013.01)

(58) Field of Classification Search
  None
  See application file for complete search history.

(56) References Cited

U.S. PATENT DOCUMENTS

| | | | |
|---|---|---|---|
| 3,216,285 A | 11/1965 | Nasvytis | |
| 4,157,668 A * | 6/1979 | Fukuma | F16H 57/0487 475/159 |
| 4,468,985 A * | 9/1984 | Nilsson | F16H 1/2809 475/183 |
| 2007/0032330 A1* | 2/2007 | Schuler | B60N 2/0232 475/149 |
| 2015/0354668 A1* | 12/2015 | Bouwer | B64C 27/12 475/332 |

FOREIGN PATENT DOCUMENTS

| | | |
|---|---|---|
| JP | S5865361 | 4/1983 |
| JP | S6250366 | 3/1987 |
| WO | 2016/043579 | 3/2016 |

* cited by examiner

*Primary Examiner* — Jacob S. Scott
*Assistant Examiner* — Timothy Hannon
(74) *Attorney, Agent, or Firm* — Peacock Law P.C.; Janeen Vilven

(57) ABSTRACT

Compound planetary friction drive comprising an input shaft driving a sun wheel, wherein said sun wheel engages planetary wheels, which planetary wheels are arranged with a first part having a first radius and a second part having a second radius that differs from the first radius, and where-in a ring cylinder is provided that is engaged by the planetary wheels such that the sun wheel is in frictional engagement with the first part of the planetary wheels and the ring cylinder is in frictional engagement with the second part of the planetary wheels, wherein the planetary wheels are hollow and compressible.

5 Claims, 6 Drawing Sheets

1. First ring annulus
2. Sun wheel
3. Compound hollow planet wheel
4. Idling sun wheel
5. Second ring annulus 1. First ring annulus
2. Sun wheel
3. Compound hollow planet wheel
4. Idling sun wheel
5. Second ring annulus 1. First ring annulus
2. Sun wheel
3. Compound hollow planet wheel
4. Idling sun wheel
5. Second ring annulus 1. First ring annulus
2. Sun wheel
3. Compound hollow planet wheel
4. Idling sun wheel
5. Second ring annulus 1. First ring annulus
2. Sun wheel
3. Compound hollow planet wheel
   A. Hollow planet step
4. Idling sun wheel
5. Second ring annulus
6. First idler wheels
7. Second idler wheels
8. Idler wheel carrier 1. First ring annulus
   (obscured by second ring annulus)
2. Sun wheel
3. Compound hollow planet wheel
4. Idling sun wheel
5. Second ring annulus
6. First idler wheels
7. Second idler wheels
8. Idler wheel carrier 1. First ring annulus
   (obscured by second ring annulus)
2. Sun wheel
3. Compound hollow planet wheel
4. Idling sun wheel
5. Second ring annulus
6. First idler wheels
7. Second idler wheels
8. Idler wheel carrier

COMPOUND PLANETARY FRICTION DRIVE

CROSS-REFERENCE TO RELATED APPLICATIONS

This application is a continuation of the filing of Patent Cooperation Treaty Application No. PCT/NL2015/050607, filed on Sep. 2, 2015, which claims priority to Netherlands Patent Application No. 2013496, filed on Sep. 19, 2014, and the specifications and claims thereof are incorporated herein by reference.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION BY REFERENCE OF MATERIAL SUBMITTED ON A COMPACT DISC

Not Applicable.

STATEMENT REGARDING PRIOR DISCLOSURES BY THE INVENTOR OR A JOINT INVENTOR

Not Applicable.

COPYRIGHTED MATERIAL

Not Applicable.

BACKGROUND OF THE INVENTION

Field of the Invention (Technical Field)

The present invention relates to a compound planetary friction drive comprising a first sun wheel, wherein said first sun wheel engages planetary wheels, which planetary wheels are arranged with a first part having a first radius and a second part having a second radius, wherein the second radius differs from the first radius and a transition region is provided between the first part and the second part, and wherein at least one ring annulus is provided that is driven by the planetary wheels, wherein the sun wheel is in frictional engagement with the first part of the planetary wheels, said first part of the planetary wheels is in frictional engagement with a first ring annulus and a second ring annulus is in frictional engagement with the second part of the planetary wheels.

Description of Related Art Including Information Disclosed Under 37 C.F.R. §§ 1.97 and 1.98

JP S58 65361 discloses a planetary friction drive with planetary rollers that have different radius and are connected to each other coaxially.

A compound planetary friction drive according to the preamble is known from U.S. Pat. No. 3,216,285. A compound planetary friction drive is well to be distinguished from a conventional compound planetary drive with discrete gear teeth. The invention is expressly restricted to compound planetary friction drives which do not have such discrete gear teeth.

There are difficulties within the design or implementation of existent compound planetary friction drives. Generally speaking, friction drives require a very high degree of precision to function efficiently, particularly when the drive is made from a material which is very rigid, such as steel. Due to steel having a high stress/strain relationship, a single $\frac{1}{1000}$th of a millimeter out of tolerance can result in that the compressing force will amount in the hundreds or thousands of Newtons of force, which exceeds the failure limits of the material.

Friction drives also have a minimum practical size, which is constrained on one hand by the total amount of torque that needs to be carried as well as the materials used. This is because when two cylinders are placed in contact, the line where they touch each other is deformed. The maximum stress experienced by two cylinders in contact is inversely proportional to the diameter of the smallest cylinder, and with all other things being equal, this incites the designer of a friction drive to apply larger diameter cylinders.

When taken together, both problems mean that a compact high-force friction drive is not manufacturable. It is impossible to guarantee high (but not too high) contact forces between the cylinder shaped sun wheel and planetary wheels. Since it is too challenging to guarantee that the contact forces for a small friction drive will remain below a certain level, making a compound drive is even less attractive or more of a challenge, since an efficient high-ratio drive requires very precise control of the level of the contact force in the output stage of the drive. As a result nowadays friction epicyclic drives are used usually in high speed, low force reduction, such as in the first stage of a multi-stage epicyclic drive.

BRIEF SUMMARY OF THE INVENTION

It is therefore an object of the invention to provide a compound planetary friction drive which makes possible to provide at the same time a high gear ratio and the capability to transmit high torques.

The compound planetary friction drive of the invention is therefore embodied with the features of one or more of the appended claims.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figure 1:
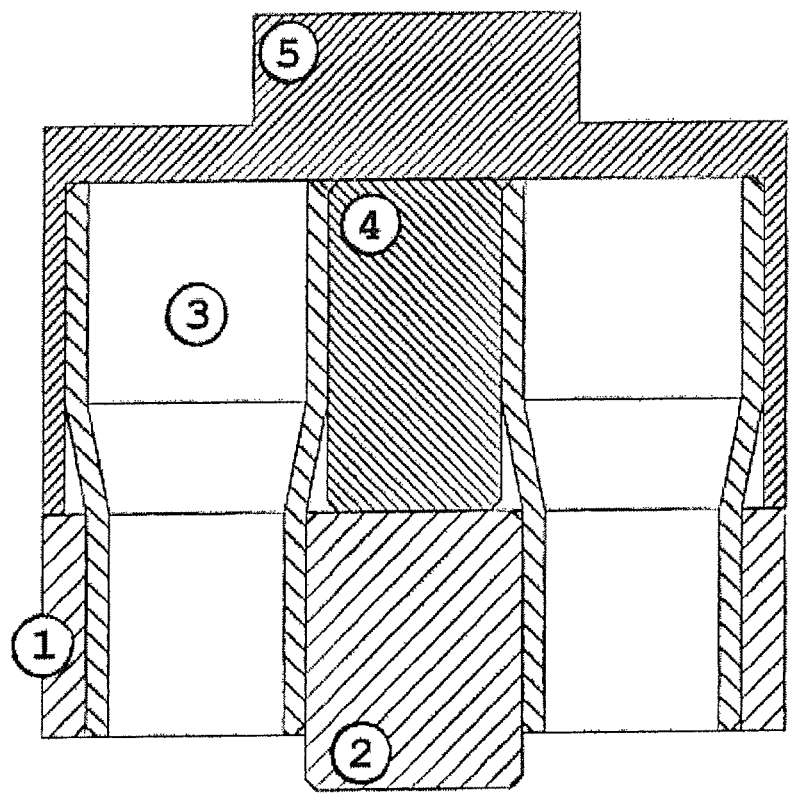
FIG. 1 shows in a cross-sectional side view a first embodiment of an apparatus according to the invention.

First and foremost, according to the invention the planetary wheels are both hollow and compressible uninterruptedly along their entire length spanning the first part, the transition region and the second part. In this connection the word 'length' means the dimension of the planetary wheels in their longitudinal direction, or in other words along or parallel to their body axis. By arranging that the planetary wheels of the compound epicyclic friction drive are hollow along their entire length, it is possible that the planetary wheels can compress along their entire body, like a hoop spring. This resolves the tolerance issues that normally are a problem for making robust and efficient friction epicyclic drives. The tolerances needed to make a barely functional small friction drive with solid planetary wheels are in the range of 0.001 mm or even better. With the compound planetary friction drive of the invention embodied with hollow compressible planetary wheels, it suffices that the planetary wheels are compressible with 0.01 mm tolerance, which is a factor 10 easier. Even higher tolerances are possible should the designer wish to pursue them, with the example of a 10:1 easing of tolerance being provided merely as illustrative of the practical improvement the invention is capable to achieve.

In another aspect of the invention the second part of the planetary wheels cooperates with an idling second sun wheel. This resolves the problem associated with the application of hollow planetary wheels in a typical epicyclic drive, being that there is nowhere to attach the output to—there is no hub, no shaft to attach to carry the load of the planetary wheels. With the compound drive of the invention, the hollow walls of the second part of the planetary wheels are delimited by the hollow wall of the idling second sun wheel and the second ring annulus—meaning there is no need to attach anything to the center of each planetary wheel to keep those wheels in place. This shifting of the output from the typical planetary carrier to a second ring annulus also conveys the advantage that the flow of power through the drive passes completely through cylinder-shaped parts which are in rolling frictional contact with each other. Thus the efficiency of the drive is enhanced.

In another favorable second embodiment of the compound planetary friction drive according to the invention, first idling wheels are imposed between the first part of the planetary wheels and the first ring annulus, and second idling wheels are imposed between the second part of the planetary wheels and the second ring annulus. The idling wheels create in conjunction with the first and second sun wheels a triangular suspension of the hollow planetary wheels. This arrangement prevents the hollow planetary wheels from advancing or retreating relative to the other wheels. To support their function, it is preferable that the first idling wheels and the second idling wheels are axially aligned. For this purpose, advantageously the first idling wheels and the second idling wheels are mounted on a carrier structure which allows the first and second idling wheels to rotate freely, but remain in axial alignment.

The invention will hereinafter be further elucidated with reference to the drawing of an exemplary embodiment of a compound planetary friction drive according to the invention that is not limiting as to the appended claims.

Whenever in the figures the same reference numerals are applied, these numerals refer to the same parts.

Figure 2:
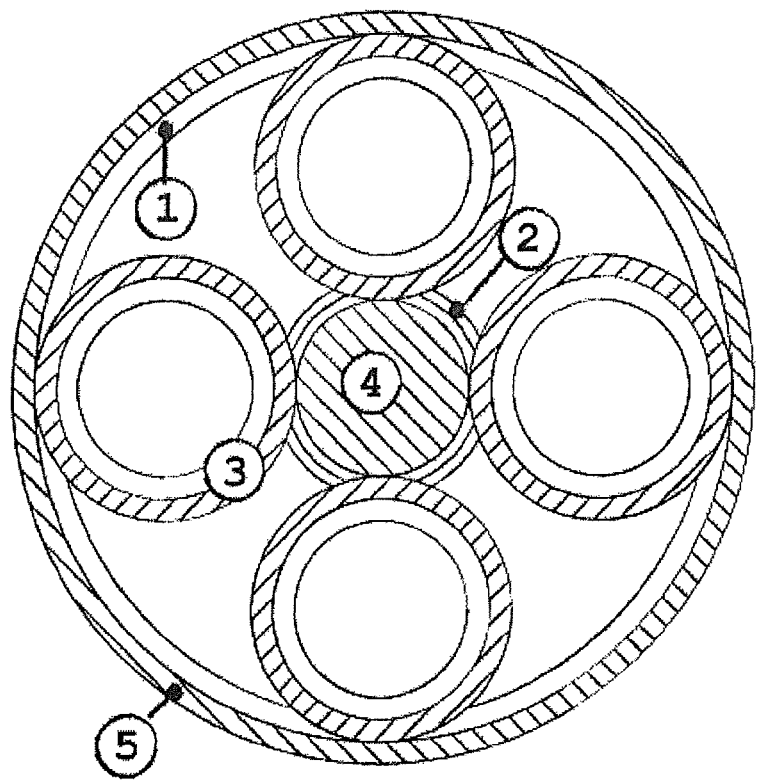
FIG. 2 shows a top down view of the apparatus according to FIG. 1.

With reference to FIG. 1 and FIG. 2 an exemplary compound planetary friction drive according to a first basic embodiment is shown provided with a mounting or input first ring annulus 1. This first ring annulus 1 can for in-stance be the outer housing of the 'lower' portion of a drive according to the invention. This mounting or first ring annulus 1 can be rigidly attached to the fixed world, or to an engine housing or a source of power structure. Further the compound planetary friction drive has a drive or input sun wheel 2, coming for instance from a motor of some sort. The hollow compound planetary wheels of the planetary friction drive of the invention are indicated with reference 3. Each planetary wheel 3 is for instance a hollow tube, with a slight difference in size between the 'lower' and 'upper' parts of the tube. A transition region is provided between the 'lower' and 'upper parts' of the tube; in FIG. 4 to be discussed hereinafter this transition region is indicated with reference A. According to the invention the planetary wheels 3 are both hollow and compressible uninterruptedly along their entire length spanning the 'lower' and 'upper' parts of the tube as well as the transition region in between and connecting said parts. Between the upper parts of the planetary wheels 3 an idling second sun wheel 4 is provided. This idling second sun wheel 4 serves mostly to keep the forces acting on the planetary wheels 3 balanced. Reference 5 indicates the second ring annulus. This is the outer housing of the 'upper' portion of the drive, and is the typical output.

Figure 4:
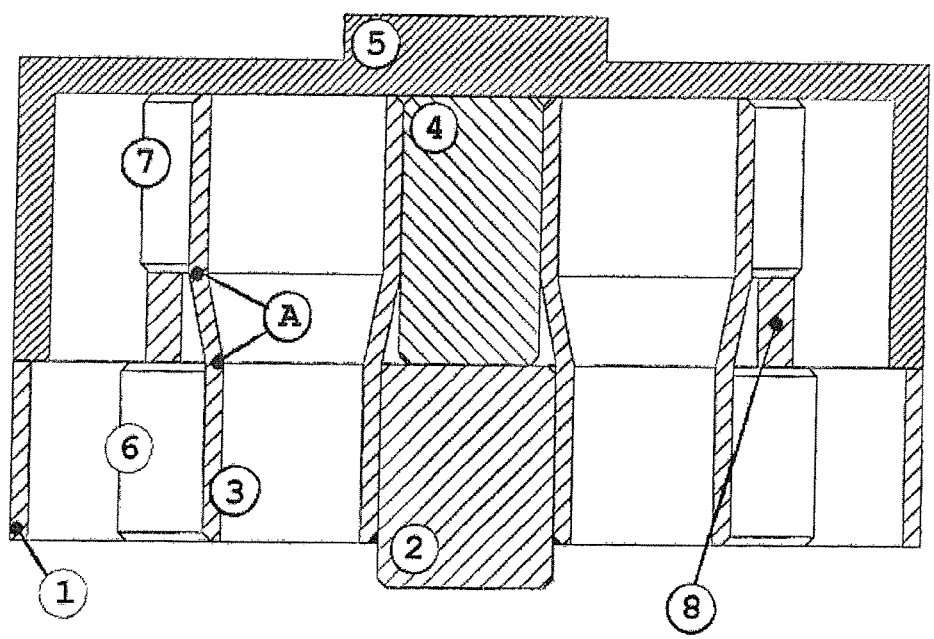
FIG. 4 shows in a cross-sectional side view a second embodiment of an apparatus according to the invention.
Figure 5:
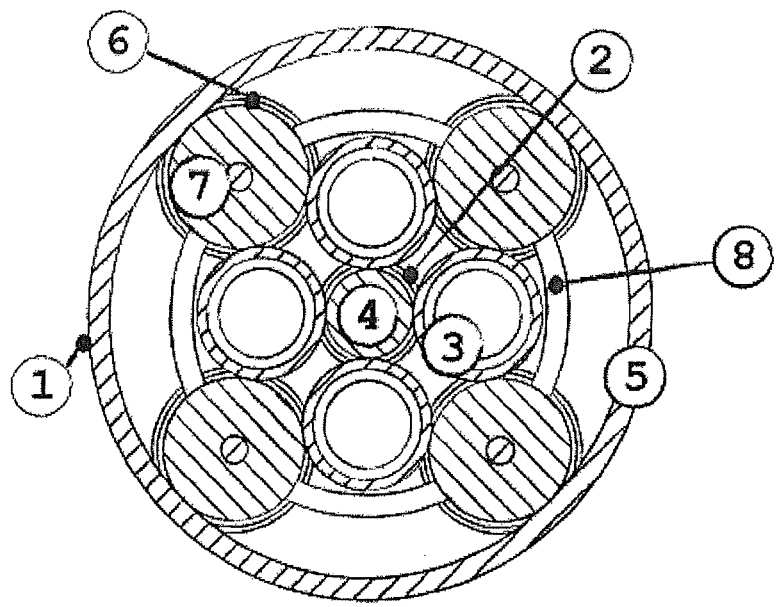
FIG. 5 shows a top down view of the apparatus according to FIG. 4.

FIGS. 4 and 5 show a second advantageous embodiment of the apparatus of the invention with a similar function as that of the first embodiment described with reference to FIGS. 1 and 2. In addition to the first embodiment the second embodiment shown in FIGS. 4 and 5 exhibits three further components; notably first idling wheels 6 that are imposed between the first part of the hollow planetary wheels 3 and the first ring annulus 1; second idling wheels 7 that are imposed between the second part of the hollow planetary wheels 3 and the second ring annulus 5; and a carrier structure 8 for these idling wheels 6, 7.

The idling wheels 6, 7 are axially aligned via said carrier structure 8 which allows the idling wheel 6, 7 to rotate freely, but remain in axial alignment. The idling wheels 6, 7 create in conjunction with the first and second sun wheels 1, 4 a triangular suspension of the hollow planetary wheels 3. This arrangement prevents the hollow planetary wheels 3 from advancing or retreating relative to the other wheels of the drive.

In the most common implementation for the transmission of the invention, the input or first (mounting) ring annulus 1 is fixed to the ground, or base of another (larger) device. Rotational power is supplied by the input (drive) or first sun wheel 2. The hollow compound planetary wheels 3 are placed symmetrically around the input or first sun wheel 2, and are compressed in the lower part of the apparatus between the input sun wheel 2 and the mounting or first ring annulus 1.

Figure 3:
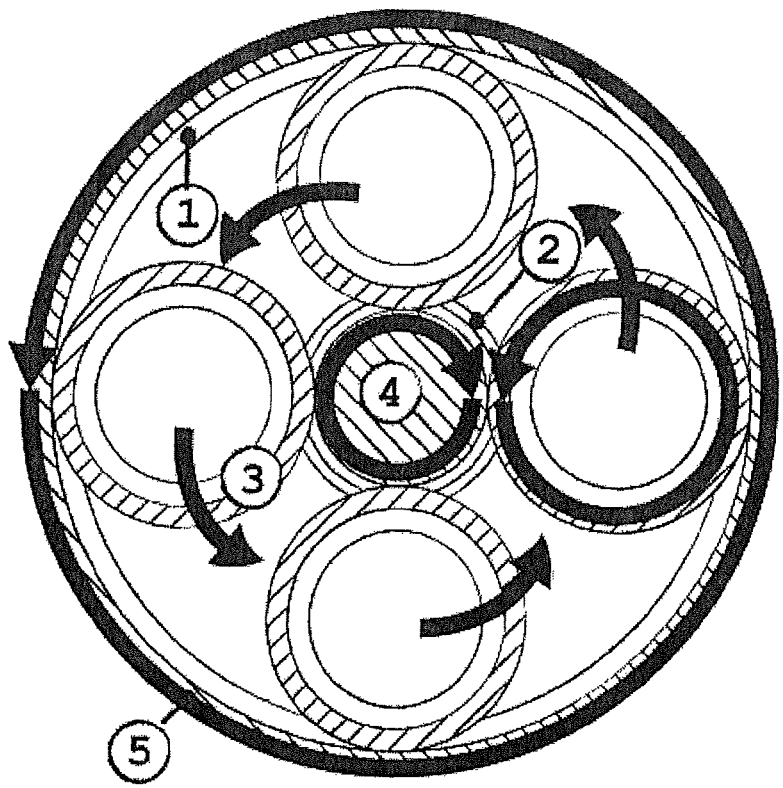
FIG. 3 illustrates the motion of the parts of the apparatus according to FIG. 1, when in operation.

FIG. 3 relating to the first embodiment shows that when the first sun wheel 2 is turned, the compound planetary wheels 3 roll along the inner wall of the first ring annulus 1.

This is exactly as in standard epicyclic transmission. While the planetary wheels 3 are 'rolling' along the inner wall of the first ring annulus 1, they are also rotating about their individual axis. Because of the small step present in the radius of the planetary wheels 3 (FIG. 1 shows clearly that the top half of the planetary wheels is of a slightly larger diameter than that of the lower half), the tangential velocity of the 'output' or up-per portion of the compound planetary wheels 3 is slightly higher than that of the 'input' or lower portion of said planetary wheels 3. This relation can also be reversed so as to have the tangential velocity of the input larger than that of the output by making the diameter of the top half of the planetary wheels slightly smaller than that of the lower half.

The output or upper portion of the compound planetary wheels 3 is in turn in contact with the inner wall of the output or second ring annulus 5, and the second idling sun wheel 4 is at all times in the center of the upper part of the entire arrangement. The idling second sun wheel 4 serves a very important role—it provides an equalizing compressive force to keep the compound planetary wheels 3 at the upper portion of the drive 'squeezed' properly, and keeps the torque forces from causing undesirable imbalances in the orientation of the transmission.

Figure 6:
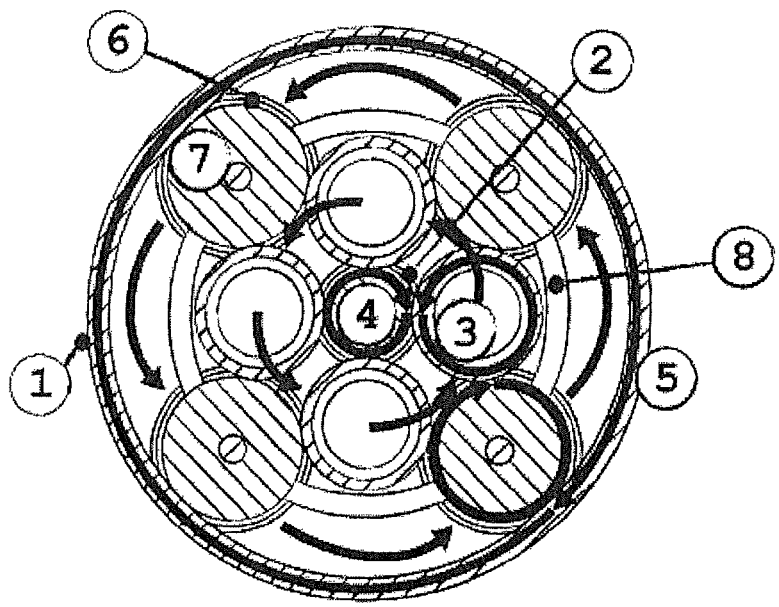
FIG. 6 illustrates the motion of the parts of the apparatus according to FIG. 4, when in operation.

In FIG. 6 the additional first idling wheels 6 that are imposed between the first part of the hollow planetary wheels 3 and the first ring annulus 1, and the second idling wheels 7 that are imposed between the second part of the hollow planetary wheels 3 and the second ring annulus 5, provide that with the first sun wheel 2 having the same direction as in the first embodiment, the rotational direction of the second or output ring annulus 5 is reversed. Most importantly however is that the idling wheels 6, 7 create in conjunction with the first and second sun wheels 1, 4 a triangular suspension of the hollow planetary wheels 3.

The sign of the step change in the compound planetary wheels 3 controls the rotational direction of the second ring annulus 5; if the step size is 'positive'—that is, if the radius of the output or upper side of the com-pound planetary wheels 3 is larger than the radius at the lower or input side, the transmission will be a reversing type. Where the first sun wheel 2 turns one direction, the output or second ring annulus 5 will turn the other direction. Conversely if the step size is negative (that is when the radius of the output or upper side is smaller than the radius of the input or lower side of the planetary wheels 3), the output or second annulus 5 will turn in the contra-rotational direction to the prior case. The advantage of this is that the overall size of the device, and the basic mathematics to design it are independent of the flow of power.

The gear ratio of the drive is determined by the size of the step in the compound planetary wheels 3. The major part of the equation determining the gear ratio is:

$$\frac{\text{nominal planet diameter}}{\text{step size}}$$

This means that the largest effect on the gear ratio is obtained by making the step size very small. The simplicity of this relation is provided to show the major advantage of such a drive.

According to the invention the compound planetary wheels 3 are both hollow and compressible along their entire longitudinal length spanning the upper part, the lower part and the transition region connecting these parts. By making the planetary wheels 3 hollow and compressible along their entire longitudinal length, it is possible to deform the wheels slightly when the transmission is assembled. Accordingly, it is possible to control how much force is inflicted by the wall contact of the planetary wheels 3 with neighboring walls of the first sun wheel 2, the idling second sun wheel 4 and the output or second annulus 5, simply by varying the overall diameter of the planetary wheels 3, and the thickness of their walls.

Continual excessive deformation of the planetary wheels 3 may have a negative influence on the lifespan of the transmission, however the transmission can be designed so that the planetary wheels 3 are never deformed or loaded beyond their theoretical infinite loading scenario. The slight deformation of the planetary wheels 3 should have very little or no cost in terms of energy efficiency, provided a non-deforming material is used (such as steel, used below its yield threshold).

The compound planetary friction drive of the invention is exceptionally efficient. Epicyclic friction transmissions in general have a theoretical efficiency exceeding 99.99%, although this is rarely achieved, due to the earlier mentioned effects. The compound planetary friction drive of the invention has a similar theoretical efficiency, but this efficiency can actually be realized, for a wide range of loads and gear ratios.

The conceivable gear ratios are limited by a combination of the overall size of the transmission, wherein larger diameter drives can have larger ratios, in the positive by the manufacturing precision achievable, in that higher degrees of precision will allow higher gear ratios, and in the negative by the maximum allowable variation in the output ratio, in that a smaller allowable variation in ratio will result in a smaller overall ratio. Thus, virtually any ratio can be achieved in a single stage, with sufficient design considerations.

A further advantageous feature of the invention is that the compound planetary friction drive is straightforward to design, using a set of best practices. It requires no special machining hardware or expertise, can be made to very good quality in any capable machine shop. The basic de-sign is directly scalable—the load carrying capability can be increased by either increasing the diameter of the drive or by increasing its length, all other things being equal.

Although the invention has been discussed in the foregoing with reference to an exemplary embodiment of the compound planetary friction drive of the invention, the invention is not restricted to this particular embodiment which can be varied in many ways without departing from the gist of the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

What is claimed is:

1. A compound planetary friction drive comprising a first sun wheel, wherein said first sun wheel engages planetary wheels, which planetary wheels are arranged with a first part having a first radius and a second part having a second radius, wherein the second radius differs from the first radius and a transition region is provided between the first part and the second part, and wherein at least one ring annulus is provided that is driven by the planetary wheels, wherein the first sun wheel is in frictional engagement with the first part of the planetary wheels, said first part of the planetary wheels is in frictional engagement with a first ring annulus and a second ring annulus is in frictional engagement with the second part of the planetary wheels, and wherein the planetary wheels are both hollow and compressible uninterruptedly along their entire length spanning the first part, the transition region and the second part.

2. The compound planetary friction drive according to claim 1, wherein the second part of the planetary wheels cooperates with an idling second sun wheel.

3. The compound planetary friction drive according to claim 1, wherein first idling wheels are imposed between the first part of the planetary wheels and the first ring annulus, and second idling wheels are imposed between the second part of the planetary wheels and the second ring annulus.

4. The compound planetary friction drive according to claim 3, wherein the first idling wheels and the second idling wheels are axially aligned.

5. The compound planetary friction drive according to claim 3, wherein the first idling wheels and the second idling wheels are mounted on a carrier structure which allows the first and second idling wheels to rotate freely, but remain in axial alignment.

\* \* \* \* \*